United States Patent [19]

Howe

[11] 3,912,448
[45] Oct. 14, 1975

[54] PROCESS OF FELLMONGERING ANIMAL SKINS WITH A DEPILATORY COMPOSITION

[75] Inventor: James Henry Howe, Manly, Australia

[73] Assignee: Global Wool Investments Limited, Hong Kong, Hong Kong

[22] Filed: May 17, 1974

[21] Appl. No.: 471,095

Related U.S. Application Data

[62] Division of Ser. No. 236,592, March 21, 1972, Pat. No. 3,860,530.

[30] Foreign Application Priority Data

Mar. 29, 1971 Australia.............................. 415157

[52] U.S. Cl. .............. 8/94.16; 252/363.5; 252/364; 260/501.17
[51] Int. Cl.² ........................................ C14C 1/06
[58] Field of Search .......... 8/94.16; 252/363.5, 364; 424/70; 260/501.17

[56] References Cited
UNITED STATES PATENTS

| | | | |
|---|---|---|---|
| 1,976,881 | 10/1934 | Harvey, Jr. .......................... | 8/94.16 |
| 2,850,461 | 9/1958 | Block et al.......................... | 252/364 |
| 3,582,254 | 6/1971 | Lindemann et al.................. | 8/94.16 |

FOREIGN PATENTS OR APPLICATIONS

| | | | |
|---|---|---|---|
| 785,112 | 10/1957 | United Kingdom.................. | 8/94.16 |

*Primary Examiner*—Morton Foelak
*Attorney, Agent, or Firm*—Ladas, Parry, Von Gehr, Goldsmith & Deschamps

[57] ABSTRACT

A non-aqueous depilatory composition for use in fellmongering animal skins, comprising a reaction product of lower aliphatic carboxylic acids or their anhydrides and a lower alkanolamine and, in a modification, urea, is provided.

6 Claims, No Drawings

PROCESS OF FELLMONGERING ANIMAL SKINS WITH A DEPILATORY COMPOSITION

This is a division, of application Ser. No. 236,592 filed Mar. 21, 1972, now U.S. Pat. No. 3,860,530.

The present invention relates to a depilatory composition for use in separating animal fibres from skins, more particularly for separating wool from sheepskins, and to a process of fellmongering using such depilatory composition.

The normal methods of fellmongering commonly used are:

1. Treatment of the skins with an aqueous solution or suspension of sodium sulphide and/or sodium hydrosulphide, sodium hydroxide or calcium hydroxide and, if desired, a thickening agent such as clay.
2. Treatment of the skins with an aqueous solution or suspension of a proteolytic enzyme, which, if desired, may contain a bactericide, such as sodium chlorite, and/or a thickening agent such as sodium carboxymethyl cellulose.
3. Treatment of the skins with an aqueous solution of acetic acid and sodium acetate and, if desired, a thickening agent such as modified starch.
4. The ages old "sweating process" of fellmongering sheep skins wherein proteolytic enzymes produced by bacterial multiplication are used to loosen the wool fibres in the follicle of the pelt. In this process water is used to keep the skins wetted so that the bacterial process may continue.

All of these known methods of fellmongering suffer from one or more disadvantages. For example, they all involve the use of water or aqueous solutions or suspensions and the presence of water causes bacterial action which results in putrefaction, thereby detrimentally affecting the colour and odour of the wool, and also leads to damage to the pelt. In extreme cases the damage to the pelt may be so great as to cause total rejection of the pelt from subsequent tanning. Another disadvantage of these processes is that they are all rather slow and time consuming more so in the case of the "sweating" process. In the case of the sulphide process the wool removed often exhibis damage to the wool fibres which results in unwanted breakages during subsequent carding and combing while, when lime is included in the depilatory composition, difficulty is experienced in obtaining even dyeing of the wool due to its being impregnated with calcium salts. Yet another disadvantage which can arise where a modern dewoolling machine is used to remove the wool after treating with a depilatory composition is that if a thickening agent has been used in the depilatory this leaves an adhesive residue which causes the skin to wrap itself around the checkered roller, which roller is used to feed the skin between a rotating rubber roller and a rotating bladed roller, thereby causing appreciable delays in processing.

The object of the present invention is to provide a depilatory composition which will overcome the above-mentioned disadvantages thereby resulting in a composition which will remove animal fibres from skins, more particularly wool from sheepskins, in a comparatively short time with little or no damage to either the fibres which are removed or to the resultant pelt.

In accordance with the present invention there is provided a non-aqueous depilatory composition for removing animal fibres from animal skins which comprises a reaction product of from 53 to 84% by weight of one or more lower aliphatic carboxylic acids and/or the anhydrides thereof and from 47 to 16% by weight of a lower alkanolamine.

In a modification, the non-aqueous depilatory composition of this invention can additionally contain urea in which case the composition comprises a mixture or reaction product of from 47 to 70% by weight of one or more lower aliphatic carboxylic acids and/or the anhydrides thereof, from 12 to 35% by weight of a lower alkanolamine, and from 10 to 32% by weight of urea.

The present invention also provides a process for fellmongering animal skins which comprises applying to the flesh side of said skins a non-aqueous depilatory composition as above defined, maintaining said skins at a temperature of from 80° to 105°F in an atmosphere of 95 to 100% relative humidity until the fibres on said skins are loosened, and then removing said fibres from said skins.

In use it has been found that the depilatory compositions of this invention when applied to the flesh side of sheepskins at the rate of between three and four ounces per square yard, with the skins thereafter being maintained at a temperature of 90°F in an atmosphere of 95 to 100% relative humidity, will produce complete depilation of the skins in 14 to 15 hours. Where higher temperatures are used the time taken for complete depilation will be reduced, while lower temperatures will increase the depilation time.

In preparing the depilatory composition of this invention the various ingredients thereof are mixed together in a stainless steel vessel. As the reaction is exothermic it is necessary to provide a heat exchanger in order to control the temperature of the reaction. The reaction of the various ingredients produces a non-aqueous solution which is thereafter used as a depilatory paint which is applied to the flesh side of the skins to be treated, more particularly to lamb, sheep and ram skins.

The lower aliphatic acid or anhydride used is preferably saturated and monobasic, for example, formic acid, propionic acid and butyric acid, or anhydrides such as propionic acid anhydride and butyric acid anhydride, but is preferably acetic anhydride, glacial acetic acid or a mixture thereof.

The lower alkanolamine used is preferably monoethanolamine, however other alkanolamines such as diethanolamine and triethanolamine can equally well be used.

In the case of a composition formed from monoethanolamine, acetic anhydride and urea, these components react to form acetate compounds which, when applied to an animal skin, will preferentially solubilize the keratin type epidermal layer of the pelt thereby allowing the fibres to be removed freely from the follicles. Another action of these compositions is to partly solubilize unrequired noncollagen proteins within the pelt structure. Where urea is included in the composition this aids in the penetration of the pelt and also aids hydrolysis of non-collagen breakdown proteins during subsequent processing of the pelt in aqueous solutions.

The compositions of the present invention can contain minor amounts of additives such as fungicides, if desired. The compositions of the present invention, being nonaqueous, allow a higher concentration of the active ingredients to be applied to the skins than do the prior art aqueous compositions and this permits a quicker penetration of such ingredients through the pelt thereby reducing the time required for depilation. Another advantage of the present compositions is that they are equally effective with both thin pelted skins, such as lamb skins, and thick pelted skins, such as ram skins, allowing a similr ease of "pulling" of the wool in both cases. So far as we are aware no other acid depilatory composition give a satisfactory "pulling" on ram skins whether this can be done manually or by means of dewoolling machines.

The use of the depilatory compositions of this invention allows a quicker depilation period than do other known acid depilatories; produces a depilated skin suitable for wool separation from the pelt by dewoolling machines rather than manually; produces a first quality fellmongered wool which is chemically undamaged; and produces a pickled pelt of good quality have the desired properties required by the tanning industry. These compositions also allow superior bactericidal control thereby resulting in pickled pelts which have a "grain" surface undamaged by bacteria.

The following Tables list various compositions containing the preferred ingredients i.e. acetic anhydride or glacial acetic acid and monoethanolamine both with and without urea. In each Table the amount of each ingredient is given as a percentage by weight, with the left hand column giving the percentages for a low monoethanolamine content composition, the right hand column the percentages for a high monoethanolamine content composition and the central column the percentages for an optimum monoethanolamine content composition. As the pH values of these compositions will vary with the relative proportions of the ingredients contained therein, e.g. lower monoethanolamine content (or higher acid content) compositions will have a lower pH than higher monoethanolamine content compositions, the amount of such compositions applied to the skins should be varied in accordance with their pH values. Thus, a low monoethanolamine content composition may have a pH of about 3.5, whereas it is desirable to obtain a pH of about 4.5 around the follicle of the wool shaft for depilation, such a composition should be used much more sparingly, so as to try and obtain the desired pH value at the follicle, than would a higher monoethanolamine content composition which may have a pH as high as 4.8. In general, the low monoethanolamine content compositions would be applied at a rate of about 4 ounces per skin, the optimum monoethanolamine content compositions at a rate of about 8 ounces per skin, and the high monoethanolamine content compositions at a rate of about 12 ounces per skin.

TABLE I

| Acetic Anhydride | 63.0 | 51.5 | 47.0 |
| Urea | 13.0 | 16.5 | 18.0 |
| Monoethanolamine | 24.0 | 32.0 | 35.0 |

TABLE II

| Acetic Anhydride | 72.0 | 62.5 | 53.0 |
| Monoethanolamine | 28.0 | 37.5 | 47.0 |

TABLE III

| Glacial Acetic Acid | 70.0 | 62.8 | 56.0 |
| Urea | 18.0 | 22.0 | 25.0 |
| Monoethanolamine | 12.0 | 15.2 | 19.0 |

TABLE IV

| Glacial Acetic Acid | 84.0 | 76.0 | 58.0 |
| Monoethanolamine | 16.0 | 24.0 | 42.0 |

The present invention will now be more particularly described by means of the following detailed description of a preferred method of carrying same into effect:

Fresh skins from recently killed sheep are graded for wool length and fibre quality e.g. 3 inches length, 25 microns diameter of wool fibre. The graded skins are placed in separate heaps according to the gradings thereof and, when enough skins have been accumulated, are washed free of blood around the neck area by passing them through a trough-like tank containing running water, sandwich belt conveyors and squeeze rollers.

The deblooded skins are then freed of any burrs which are held in the wool by passing them backwards and forwards through a deburring machine in which the burrs are removed by means of revolving bladed rollers with the aid of water jets.

The wet, deburred skins are partly dried by being passed through a set of heavy squeeze rollers which expresses most of the free water from the wool.

The squeezed skins are then conveyed to an endless 5 ft. wide belt where one of the depilatory compositions of this invention e.g. a reaction product of acetic anhydride, monoethanolamine and urea, is sprayed on the flesh side of each skin at the rate of ½ oz. per square foot i.e. 4 ozs. per average 8 sq. ft. lamp skin.

After being sprayed the skins are folded flesh side to flesh side and then placed over supporting rods within a large room capable of holding 500 skins. The room is equipped with an air circulation fan giving approximately 8,000 cubic ft./min. air flow, steam supply and temperature control means. When the room has been filled with skins, which are hung on the supporting rods at intervals of about 6 inches to 8 inches so as to leave space for air to pass between each neighbouring skin, the air circulation fan is turned on and steam admitted at a controlled rate to bring the skins to the desired temperature e.g. 92°F, as quickly as possible. The room temperature is then held constant at the desired temperature for about 16 to 18 hours to allow for depilation of the skins.

The depilated skins are then removed from the treating room and the wool removed from the pelts of the skins by passing the skins through a machine wherein the wool is drawn away from the pelt by a rotating bladed roller while the rest of the skin is held between two other rollers.

The wool coming from the dewoolling machine is "skirted", whereby inferior wool "2nds" such as hairy belly wool is manually separated from the bulk wool to give more uniformity of fibre length and diameter in the main fleece. The wool is then washed in a scour bowl, dried in a temperature controlled continuous wool drier, and, after a conditioning period, baled by pressing in a wool baling machine.

The pelts are prepared for tanning by being treated in pelt paddle dollys or revolving drums with ammonium hydroxide (0.880 solution) for neutralizing; sodium sulphide and caustic soda for removing hair and noncollagen proteins within the pelt; ammonium chloride for desulphiding the pelts; and a pickle solution containing 13% salt and 1% sulphuric acid for pickling the pelts so as to preserve them and thereby allow them to be kept for an indefinite period before being tanned.

What I claim is:

1. A process for fellmongerng animal skins which comprises applying to the flesh side of said skins a depilatory composition which consists essentially of a reaction product of from 53 to 84% by weight of one or more lower aliphatic carboxylic acids and/or the anhydrides thereof and from 16 to 47% by weight of a lower alkanolamine, said composition being substantially non-aqueous and having a pH composition being substantially non-aqueous and having a pH within the range of 3.5 to 4.8 when in aqueous solution; maintaining said skins at a temperature of from 80° to 105°F. in an atmosphere of from 95 to 100% relative humidity until the fibers on said skins are loosened, and then removing said fibers from the skins.

2. A process for fellmongering animal skins which comprises applying to the flesh side of said skins a depilatory composition which consists essentially of a reaction product of from 47 to 70% by weight of one or more lower aliphatic carboxylic acids and/or the anhydrides thereof, from 12 to 35% by weight of a lower alkanolamine, and from 10 to 35% by weight of urea, said composition being substantially non-aqueous and having a pH within the range of 3.5 to 4.8 when in aqueous solution; maintaining said skins at a temperature of from 80° to 105°F. in an atmosphere of from 95 to 100% relative humidity until the fibers on said skins are loosened, and then removing said fibers from the skins.

3. A process according to claim 1 wherein the temperature is maintained at 92°F. for from 16 to 18 hours.

4. A process according to claim 2 wherein the temperature is maintained at 92°F. for from 16 to 18 hours.

5. Fellmongered animal skins which have been treated by the process of claim 1.

6. Fellmongered animal skins which have been treated by the process of claim 2.

* * * * *